United States Patent [19]

Nakasone et al.

[11] Patent Number: 4,976,906
[45] Date of Patent: Dec. 11, 1990

[54] METHOD AND APPARATUS FOR SHAPING A CONTINUOUS ROD-LIKE MOLDING

[75] Inventors: Takayoshi Nakasone, Gifu; Kenji Kozuka, ichinomiya; Haruo Kimura, Kasamatsu, all of Japan

[73] Assignee: Ube-Nitto Kasei Co., Ltd., Tokyo, Japan

[21] Appl. No.: 829,860

[22] Filed: Feb. 18, 1986

Related U.S. Application Data

[63] Continuation of Ser. No. 597,941, Apr. 5, 1984, abandoned.

[30] Foreign Application Priority Data

Jan. 24, 1984 [JP] Japan ................................ 59-9415

[51] Int. Cl.⁵ ............................................ B29C 47/90
[52] U.S. Cl. ..................................... 264/139; 264/163; 264/237; 264/345; 264/DIG. 65; 425/112; 425/144; 425/378.1
[58] Field of Search ............................. 264/135–137, 264/174, 139, 236, 347, 237, 348, 345, 163, DIG. 65; 425/112, 378.1, 379.1, 144

[56] References Cited

U.S. PATENT DOCUMENTS

| | | |
|---|---|---|
| 2,446,620 | 8/1948 | Swallow et al. . |
| 2,721,820 | 10/1955 | Von Reis et al. . |
| 2,770,014 | 11/1956 | Nordlin et al. ..................... 264/280 |
| 3,290,420 | 12/1966 | Orser ................................... 264/280 |
| 3,411,181 | 11/1968 | Cawley ............................... 264/174 |
| 3,470,051 | 9/1969 | Meyer . |
| 3,513,228 | 5/1970 | Miyauchi et al. . |
| 3,529,050 | 9/1970 | Smith ................................... 264/174 |
| 3,538,207 | 11/1970 | Toole . |
| 3,588,954 | 6/1971 | Nakamura et al. . |
| 3,865,466 | 2/1975 | Slaughter . |
| 3,946,097 | 3/1976 | Takahashi et al. ................. 264/174 |
| 3,993,726 | 11/1976 | Moyer ................................. 264/174 |
| 4,038,018 | 7/1977 | Pepmeier ............................ 425/112 |
| 4,089,923 | 5/1978 | Theodossi et al. ................. 264/174 |
| 4,156,104 | 5/1979 | Mondello . |
| 4,247,271 | 1/1981 | Yonekura et al. . |
| 4,356,143 | 10/1982 | Hill et al. . |
| 4,394,338 | 7/1983 | Fuwa . |
| 4,720,368 | 1/1988 | Nakasone et al. ................. 264/135 |
| 4,770,834 | 9/1988 | Nakasone et al. ................. 264/137 |

FOREIGN PATENT DOCUMENTS 1048370 11/1966 United Kingdom .
1569905 6/1980 United Kingdom .

*Primary Examiner*—Jeffery Thurlow
*Attorney, Agent, or Firm*—Wenderoth, Lind & Ponack

[57] ABSTRACT

Continuous rod-like molding having a FRP core and an outer skin of thermoplastic resin is shaped by introducing the molding into a passage of a heated die, the passage having a diameter slightly smaller at an exit thereof than an initial diameter of the molding, plasticizing the thermoplastic resin by passing the molding through the passage, thereby removing a part of the outer skin, and solidifying the thermoplastic resin, thereby obtaining a product having a diameter equal to the diameter of the exit of the passage.

6 Claims, 2 Drawing Sheets

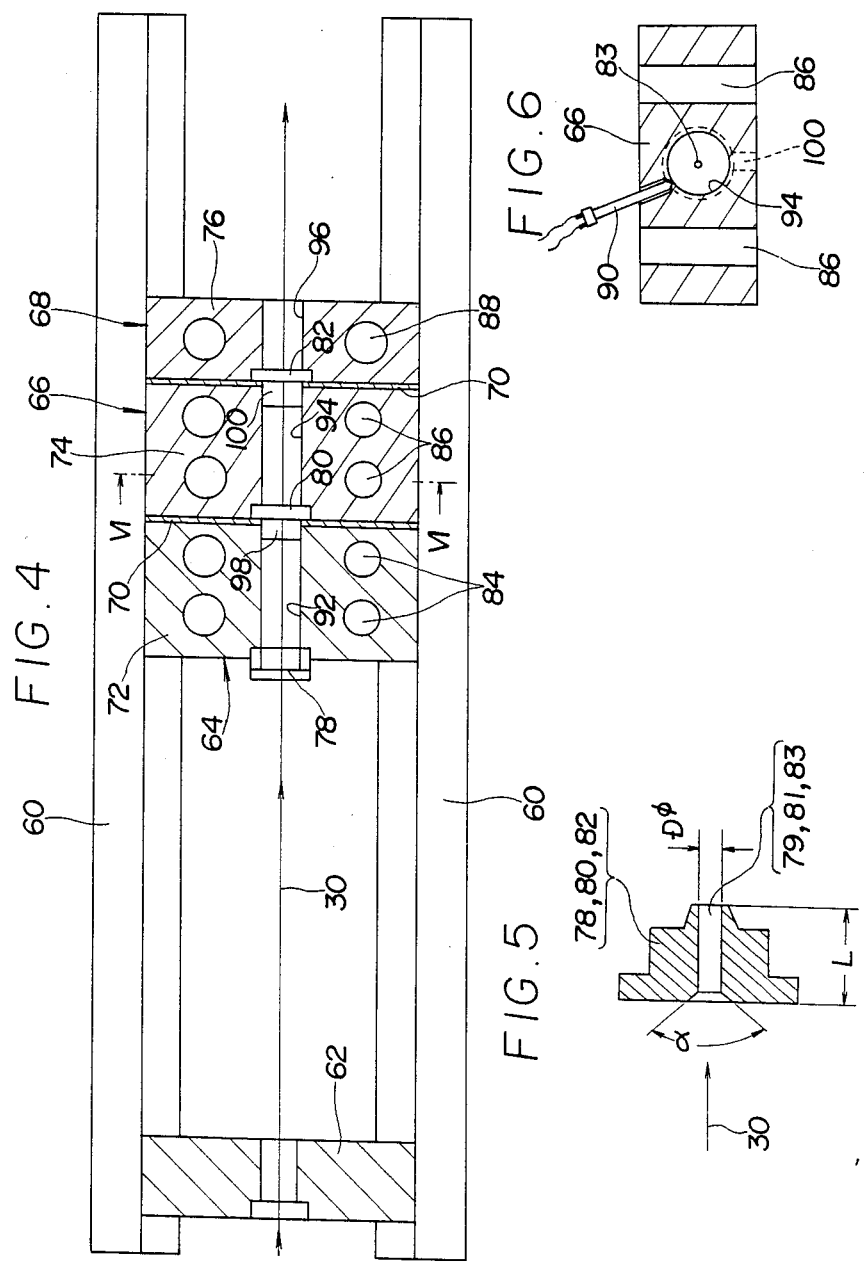

METHOD AND APPARATUS FOR SHAPING A CONTINUOUS ROD-LIKE MOLDING

This application is a continuation of now abandoned application Ser. No. 596,941 filed Apr. 5, 1984.

A method for forming a continuous rod-like molding of the type set forth above is known wherein a reinforcement fiber bundle is immersed in unset thermosetting resin liquid to form a core which is in turn covered with melted thermoplastic resin. The thermoplastic resin is cooled and solidified to form an outer skin and, thereafter, the thermosetting resin of the core is hardened through a hot setting reservoir, thereby forming the continuous rod-like molding having a predetermined rigidity and flexibility. Since this method is very simple in its operation and is efficient in obtaining the rod-like molding of the above structure, there have been manufactured a large quantity of such moldings which have been used as, for example, elastic aggregates.

Although the rod-like moldings formed in accordance with the above mentioned are sufficient for ordinary use, diametrical dimensional accuracy preferably should still be increased, particularly when the molding is used as a reinforcing member of an optical fiber or as a tension member for optical fibers, in which extremely high dimensional accuracy is required.

An optical fiber for optical communication is one of the most important fields of advanced technologies. The optical fiber element is usually coated with plastic material for increasing strength and the plastic coat should have a highly accurate dimension. The rod-like molding of the above structure would be particularly suitable for use as an optical fiber element in view of the rigidity and flexibility thereof, but must be much improved with regard to its dimensional accuracy.

Accordingly, an object of the present invention is to provide a method which makes it possible to efficiently shape a continuous rod-like molding to a desired uniform dimension with a high degree of accuracy.

Another object of the present invention is to provide a method of shaping a continuous rod-like molding, according to which a product having a smooth outer surface may be obtained.

A further object of the present invention is the provision of a method of shaping a continuous rod-like molding, which is particularly suitable as an optical fiber.

A still further object of the present invention is to provide an apparatus for shaping a continuous rod-like molding using the above method.

SUMMARY OF THE INVENTION

According to the present invention, a method of shaping a continuous rod-like molding, which comprises a core formed of fiber reinforced thermosetting resin and an outer skin formed of thermoplastic resin and covering the core, to a predetermined dimension, comprises the steps of: introducing the molding into a passage of a heated die, the passage having a diameter slightly larger at an entrance thereof but slightly smaller at an exit thereof than an initial diameter of the molding; plasticizing the thermoplastic resin of the outer skin by passing the molding through the passage thereby removing a part of the outer skin; and cooling the molding immediately after it is drawn from the heated die to solidify the thermoplastic resin, thereby obtaining a product having a diameter equal to the diameter of the exit of the passage.

The term "plasticizing" as employed herein means both softening and melting the thermoplastic resin.

Preferably, the thermoplastic resin is plasticized only at an outer surface portion thereof, i.e. of the outer skin, without being plasticized at a junction interface between the core and the outer skin, and the molding is passed through the passage without affecting the junction interface.

More preferably, the thermoplastic resin of the outer surface portion of the outer skin is softened.

The heated die may comprise a preheating die and a shaping die, the preheating die being maintained at a temperature higher than the melting point of the thermoplastic resin of the outer skin. The outer surface portion of the outer skin may be softened by passing the molding at a constant speed through the passage in the preheating die without softening the junction interface.

An apparatus according to the present invention for shaping a continuous rod-like molding, comprising a core formed of fiber reinforced thermosetting resin and an outer skin formed of thermoplastic resin and covering the core, to a predetermined dimension, comprises a die having formed therein a passage and a discharging hole. The passage has a diameter slightly larger at an entrance thereof than an initial diameter of the molding and slightly smaller at an exit thereof than the initial diameter of the molding, and the discharging hole is formed between the entrance and the exit of the passage to communicate the passage to the outside of the die. A heater is provided to maintain at least a part of the die at a temperature higher than the melting point of the thermoplastic resin of the outer skin. Also provided is a means for cooling and solidifying the thermoplastic resin which means is disposed outside of the die in the vicinity of the exit of the passage.

The die preferably comprises a preheating die and a shaping die, the preheating die being maintained at the temperature higher than the melting point of the thermoplastic resin forming the outer skin.

The passage in the preheating die may have the diameter slightly larger than the initial diameter of the molding, while the passage in the shaping die may have the diameter slightly smaller than the initial diameter of the molding, and the discharging hole may be formed at a junction of the preheating die and the shaping die.

More preferably, the shaping die further comprises a first shaping die and a second shaping die. The preheating die and the first and the second shaping dies may be independently maintained at respective temperatures, with the temperatures of the first shaping die being maintained lower than the temperatures of the other dies.

The passage may have diameters slightly larger in the preheating die than, approximated in the first shaping die to and slightly smaller in the second shaping die than the initial diameter of the molding. The discharging holes may be respectively formed at two junctions of the three dies.

Heat insulator layers may be interposed between the preheating die, the first and the second shaping dies, respectively, and means for detecting the temperatures may be provided in the respective die, thereby independently controlling the temperatures thereof.

Other objects, features and advantages of the present invention will be apparent from the following detailed description of preferred embodiments thereof when taken in conjunction with the accompanying drawings, in which:

BRIEF DESCRIPTION OF THE DRAWINGS

FIG. 4 is a horizontally sectioned view illustrating a part of an apparatus for shaping the rod-like molding according to a second embodiment of the present invention;

FIG. 5 is a longitudinally sectioned view showing a die portion of the apparatus in FIG. 4; and FIG. 6 is a cross sectional view taken along line VI—VI in FIG. 4.

DETAILED DESCRIPTION OF THE INVENTION

Figure 1:
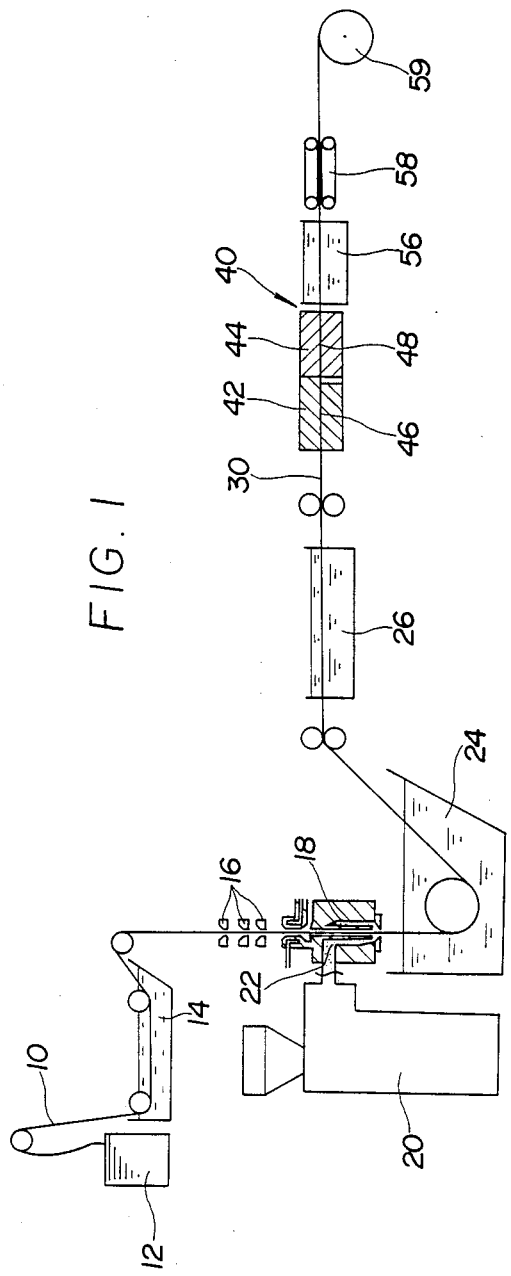
FIG. 1 is a schematic view explanatory of a method of shaping a continuous rod-like molding according to the present invention.

Referring now to FIG. 1 of the drawings, there are illustrated a device for forming a continuous rod-like molding, and an apparatus for shaping or regularizing an outer diameter of the molding according to an embodiment of the present invention. The reference numeral 10 indicates a reinforcement fiber bundle such as a glass robing or the like which has, in a preceding process, been fitted on an outer circumference of a core member, for example, an optical fiber element, along an axis thereof. The bundle 10 drawn from a bobbin 12 is immersed in unset thermosetting resin liquid at a reservoir 14 to form a core, and after being formed to a predetermined sectional shape by a die 16 the bundle 10 is introduced to a crosshead die 18. An extrusion mold machine 20 provides melted thermoplastic resin 22 into the crosshead die 18 where the resin 22 covers the outer surface of the bundle 10. The thermoplastic resin 22 is then cooled and solidified through a water tank 24 to form an outer skin around the bundle 10. If desired, this semi-molded rod may be rolled or cut out to desired length for storage before it is sent to the following process. A hot setting reservoir 26 is provided to harden the thermosetting resin impregnated in the fiber bundle 10 and thereby to obtain a rigid continuous rod-like molding 30. The above method of forming the molding 30 has been already known.

Figure 2:
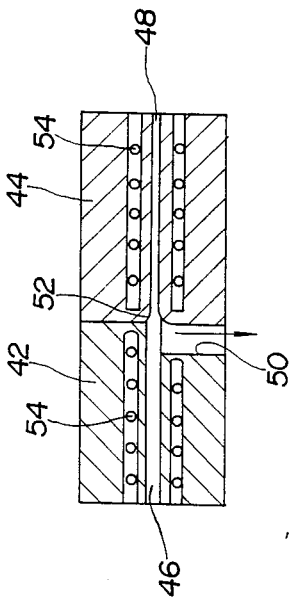
FIG. 2 is a sectional view illustrating a part of an apparatus for shaping the rod-like molding according to a first embodiment of the present invention.

The present invention resides in the following structure for shaping or regularizing the outer diameter of the molding 30 so that a final product having an accurate predetermined diameter may be obtained. The apparatus used for this purpose is generally indicated by numeral 40 and comprises a first heating block or preheating die 42 and a second heating block or shaping die 44. As best shown in FIG. 2, the first block 42 is formed with a passage 46 the diameter of which is slightly larger than the outer diameter of the rod-like molding 30, and the second block 44 is formed with a passage 48 which is smaller in diameter than the molding 30 and is approximately equal to a desired diameter of a final product to be obtained. These passages are aligned with each other and a discharging hole 50 extending perpendicularly to the passages is formed at the junction of the first and second blocks 42 and 44. The front end or the entry 52 of the passage 48 is tapered outwardly at a predetermined angle for ensuring smooth insertion of the molding 30. Arranged in the blocks 42 and 44 to surround the passages 46 and 48 are heaters 54 which maintain the passages at a temperature higher than a melting point of the thermoplastic resin forming the outer skin of the molding 30. A suitable means such as a thermocouple may be provided for detecting the temperature in the passages and thereby controlling the heaters 54.

A cooler comprising, for example, a water tank 56 is mounted in the vicinity of the rear end or the exit of the passage 48 in order to cool the molding 30 immediately after it passes through the blocks 42 and 44. Reference numeral 58 indicates a drawing roller which feeds the molding 30 to a large drum 59 for rolling up the molding as the final product.

Figure 3:
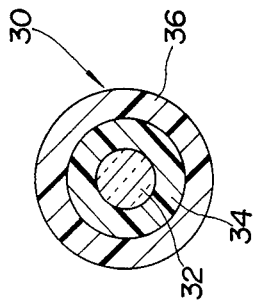
FIG. 3 is a cross sectional view illustrating an example of the molding.

FIG. 3 illustrates one example of the molding 30 in cross section before the shaping operation, but it should be understood that this example is only for purposes of explanation and that it is not intended by this example to limit moldings to which the present invention may be applied. In the example, the molding 30 comprises an axis 32 of an optical fiber element, a core 34 formed of fiber reinforced resin (FRP) and an outer skin 36 of the thermoplastic resin. This molding 30 may be formed by the method as described hereinbefore. The outer skin 36 is constituted of thermoplastic material such as linear low-density polyethylene, low-density polyethylene, high-density polyethylene, Nylon 12, polyurethane, polyether-etherketone, fluororesin or the like. Although the cross-sectional shape of the outer skin 36 is shown as a real circle for convenience of illustration, it is to be noted that the skin 36 has practically been formed to a flattened or elliptical shape to some extent.

When this molding 30 is introduced into the apparatus 40, the heater 54 heats the molding 30 passing through the passage 46 in the preheating die 42 and plasticizes the thermoplastic resin of the outer skin 36. The term "plasticize" used herein shall mean both softening and melting the thermoplastic resin. The molding 30 is then forced into the shaping die 44 through the passage 48 which has the diameter slightly smaller than that of the molding 30. Thus, the circumference of plasticized resin of the outer skin 36 is cut off or squeezed, at the entrance of the passage 48, to the extent that the diameter of the molding becomes equal to that of the passage 48, and the resin thus cut off or squeezed is removed through the discharging hole 50. The molding 30 entered in the passage 48 may pass through the same without being subject to high resistance and shear force because of the temperature in the passage 48 which is sufficient to maintain the plasticized condition of the outer skin 36. Therefore, the molding 30 drawn from the passage 48 has a smooth outer surface without cutting streaks (unevenness) and has a diameter determined by the passage 48 which has been determined to equal a desired diameter of final product.

The plasticized thermoplastic resin is then immediately cooled and solidified by a cooling means, i.e. by the water tank 58 in this embodiment, to prevent deformation of the outer skin 36 and to maintain the accuracy of the shaped or regularized molding.

A test was carried out using the above apparatus and method. In the test, a continuous rod-like molding having substantially the same cross section as shown in FIG. 3 and having a diameter of 5.24±0.15 mm was introduced into the apparatus 40. The outer skin 36 was formed of high-density polyethylene. Each of the preheating die 42 and the shaping die 44 had a length of 35 mm and was maintained at a temperature of 250° C. The molding 30 was passed through the passages 46 and 48 at a speed of 6 to 8 m/min. The molding was again measured after cooled in the tank 56 and was found to have a diameter of 5.01±0.04 mm with a high accuracy.

In the above embodiment, the apparatus includes the two separate blocks 42 and 44. If desired, however, a single block may be employed with a passage which has a large diameter at an entrance thereof and a small diameter at an exit or rear end thereof.

Preferably, but not essentially, the outer skin 36 formed of the thermoplastic resin is plasticized only at the outer surface portion thereof without affecting the junction interface between the FRP 34 and the outer skin 36. This may further increase the accuracy of the dimension of the molding 30 as will be hereinafter described in detail with reference to a second, and more preferable, embodiment of the present invention.

Referring to FIG. 4, an apparatus according to the second embodiment of the present invention includes a pair of base blocks 60 on front ends of which is mounted a guide 62. A preheating die 64, a first shaping die 66 and a second shaping die 68 are sequentially arranged side by side in the intermediate portion of the base blocks 60 with respective heat insulator layers 70 interposed therebetween. The dies 64, 66 and 68 comprise block portions 72, 74 and 76 and die portions 78, 80 and 82, respectively, the die portions being fitted to the front ends of the respective block portions. It is to be noted here that the die portions may be integral with the block portions to form unitary structures of the of respective dies. As shown in FIG. 5, the die portions 78, 80 and 82 are respectively formed with passages 79, 81 and 83 at their central portions, and the front end of each passage is tapered outwardly at a predetermined angle ($\alpha$). Diameters (D$\phi$) of the passages are determined in the following manner. That is, the passage 79 of the preheating die 64 is slightly larger than the initial diameter of the molding 30. The passage 81 of a first shaping die 66 has the diameter smaller than that of the passage 79 and approximated to the initial diameter of the molding 30, and the passage 83 of the second shaping die 68 has a diameter smaller than that of the passage 81 and substantially equal to the final product diameter. By gradually changing the diameters of the passages in the above manner, the resistance to drawing the molding 30 may be reduced and the desired diameter of the final product may be readily obtained, as described later.

Heaters 84, 86 and 88 are embedded in the dies 64, 66 and 68, respectively, for maintaining the dies at predetermined temperatures. Means for detecting the temperature of each die, such as a thermocouple 90, is provided in each of the dies although only the thermocouple 90 in the first shaping die 66 is illustrated in FIG. 6. Since the dies 64, 66 and 68 are separated from one another by the heat insulators 70, the dies can be maintained at respective temperatures by the respective heaters which are independently controlled according to temperatures detected by the thermocouples 90.

Provided in the dies at the block portions thereof are communications in the form of through-holes 92, 94 and 96 which communicate the passages 79, 81 and 83 to one another and communicate the passage 83 to the outside. Discharging holes 98 and 100 are formed adjacently to the die portions 80 and 82 for removing chipped thermoplastic resin. As in the first embodiment, the molding 30 having passed through the dies 64, 66 and 68 at the passages and the through-holes thereof is immediately cooled by a cooling means (not shown in FIG. 4) to form the final product.

In a shaping operation using the abovementioned apparatus, it is preferable to set the operating conditions such that only the outer surface portion of the skin 36 the molding 30 is plasticized with heat and that the interface junction between the FRP 34 and the skin 36 is not plasticized. Although it depends on the material of thermoplastic resin to be used for the outer skin 36 and on the thickness thereof, in many cases the interface junction is not affected unless the molding 30 is heated to an extent that the outer skin 30 is melted at the outer surface portion thereof. It is also advantageous in obtaining a smooth and shiny outer surface of the final product not to melt the outer skin 30. To soften only the outer surface portion of the skin 36 is believed to be advantageous in order to remove the possibility that, due to decrease of an adhesive force, the outer skin 36 is peeled off from the FRP 34 by shear forces which may be applied during the shaping operation and that the outer skin 36 is cut off excessively. On the other hand, however, if the outer skin 36 is insufficiently softened at the outer surface portion thereof, cutting streaks will appear on the outer surface of the final product.

In order to achieve the above conditions, i.e. to soften only the outer surface portion of the skin 36, and in order to efficiently obtain a final product with high dimensional accuracy, it is found to be an important factor that the period of time during which the molding 30 is kept in contact with the dies is shortened, depending on the material of the thermoplastic resin forming the outer skin 36. For this purpose, the present inventors carried out some experiments wherein the drawing speed of the molding 30 was fixed with use of the three dies, and temperatures of the dies, lengths (L) and diameters (D$\phi$) of the passages were changed as variable factors. As a result, the diameter of the passage 81 of the first shaping die 66 has been approximated to an average diameter of the molding 30 before shaping, and the temperature of die 66 is reduced compared with the preheating die 64 and the second shaping die 68 which are maintained at a temperature higher than the melting point of the thermoplastic resin of the outer skin 36, as described later. This is based on the assumption that a higher temperature of the passage 81 would increase the softened area, whereby the outer skin 36 would be cut off to an unrequired extent due to rheological behaviour.

A more specific example according to the second embodiment of the present invention will now be described, wherein the outer skin 36 is made of straight-chain low-density polyethylene. It should be noted that the following conditions may be changed with modification of material of the outer skin 36.

EXAMPLE

A shaping operation of the molding 30 having an initial diameter of 2.2±0.15 mm with a diameter of the FRP 34 being 1 mm was carried out under the conditions as shown in the following Table 1.

|  | Preheating Die | Shaping Die | |
| --- | --- | --- | --- |
|  |  | First | Second |
| Length (mm) | 35 | 15 | 8 |
| Passage Diameter (mm) | 2.4 | 2.2 | 2.02 |
| Drawing Speed (m/min) |  | 8 |  |

-continued

|  | Preheating Die | Shaping Die | |
|---|---|---|---|
|  |  | First | Second |
| Die Temp. (°C.) | 250 | 210 | 250 |

(Angle α of each die was formed to 120°)

A resultant product diameter was 2.02±0.02 mm with a remarkably high accuracy and the product was lustrous in appearance without occurrence of cutting streaks.

In the case that the length of each die was doubled, the product was rough at its outer surface and the skin 36 was sometimes peeled off from the FRP 34.

With regard to the temperature, when the heater 86 of the first shaping die 66 was so set to maintain the die 66 at around 260° C., the outer surface of the product was rough. On the contrary, when the die 66 was lowered, to about 160° C., there arose cutting streaks on the outer surface. Similar tests were made by changing the temperature of the second shaping die 68, and it was found that substantially the same results as in the case of the first shaping die 66 were obtained in addition to increased drawing resistance by shear force experienced at the lower temperature.

The final product of the rod-like molding is particularly suitable for use as an optical fiber because of its high dimensional accuracy. However, the method and apparatus according to the present invention may be applied to various rod-like moldings comprising FRP and the thermoplastic resin layer surrounding the FRP, for regularizing outer dimensions of such moldings.

Although the present invention has been described with reference to the preferred embodiments thereof, many modifications and alterations may be made within the spirit of the present invention.

What is claimed is:

1. A method of shaping a continuous rod-like molding to a predetermined dimension, said molding comprising a core formed of fiber reinforced thermosetting resin and an outer skin formed of thermoplastic resin and covering said core, and said molding being preformed by first solidifying said thermoplastic resin and then hardening said thermosetting resin, said method comprising the steps of:
   providing a preheating die having a passage with a diameter slightly larger than an initial diameter of said molding;
   introducing said molding into said passage;
   maintaining said preheating die at a temperature higher than the melting pint of said thermoplastic resin forming said outer skin;
   passing said molding through said passage at a predetermined speed to achieve plasticizing said thermoplastic resin of said outer skin only at an outer surface portion thereof without plasticizing said thermoplastic resin at a junction interface between said outer skin and said core;
   providing a first shaping die including a passage having a diameter approximately equal to said initial diameter of said molding;
   maintaining said first shaping die at a temperature lower than the temperature of said preheating die;
   introducing said molding into and passing said molding through said passage of said first shaping die;
   providing a second shaping die including a passage having a diameter slightly smaller than said initial diameter of said molding;
   maintaining said second shaping die at a temperature substantially equal to the temperature of said preheating die;
   introducing said molding into and passing said molding through said passage of said second shaping die, thereby removing a portion of said outer skin thereof previously plasticized by said preheating die, without affecting said junction interface; and
   cooling said molding immediately after it is removed from said second shaping die to solidify said thermoplastic resin, thereby obtaining a product having a diameter equal to said diameter of said passage of said second shaping die.

2. A method as claimed in claim 1, comprising softening said thermoplastic resin of said outer surface portion of said outer skin.

3. An apparatus for shaping a continuous rod-like molding to a predetermined dimension, said molding comprising a core formed of fiber reinforced thermosetting resin and an outer skin formed of thermoplastic resin and covering said core and being preformed by means for first solidifying said thermoplastic resin and means for then hardening said thermosetting resin, said apparatus comprising:
   a preheating die having formed therein a passage having a diameter slightly larger than an initial diameter of said molding;
   heater means for maintaining said preheating die at a temperature higher than a melting point of said thermoplastic resin to permit an outer surface portion of said outer skin to be plasticized without plasticizing a junction interface between said outer skin and said core;
   a first shaping die having formed therein a passage aligned with said passage of said preheating die, said passage of said first shaping die having a diameter approximately equal to said initial diameter of said molding, said first shaping die being maintained by heater means at a temperature lower than the temperature of said preheating die;
   a second shaping die having formed therein a passage aligned with said passage of said first shaping die, said passage of said second shaping die having a diameter slightly smaller than said initial diameter of said molding, said second shaping die being maintained by heater means at a temperature substantially equal to the temperature of said preheating die, thereby enabling removal of a portion of said outer skin without affecting said junction interface of said molding;
   a discharging hole formed at a junction between said first and second shaping dies to communicate said passages to the outside of said dies; and
   a means for cooling and solidifying said thermoplastic resin and being disposed outside said second shaping die in the vicinity of an exit of said passage.

4. An apparatus as claimed in claim 3, wherein said passages at entries of said first shaping die and said second shaping die are tapered outwardly.

5. An apparatus as claimed in claim 3, further comprising insulator layers interposed between said preheating die, said first shaping die and said second shaping die, and means for detecting independently the temperatures of each of said dies and thereby for independently controlling the temperatures thereof.

6. An apparatus as claimed in claim 5, wherein said means for detecting said temperatures comprise thermocouples.

* * * * *